US009612828B2

(12) United States Patent
Bertram et al.

(10) Patent No.: US 9,612,828 B2
(45) Date of Patent: *Apr. 4, 2017

(54) LOGGING AND PROFILING CONTENT SPACE DATA AND COVERAGE METRIC SELF-REPORTING

(71) Applicant: International Business Machines Corporation, Armonk, NY (US)

(72) Inventors: Randal L. Bertram, Raleigh, NC (US); Edward B. Boden, Highland, NY (US); John B. Diamond, Poughkeepsie, NY (US); Anthony F. Pioli, Bedford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

This patent is subject to a terminal disclaimer.

(21) Appl. No.: 14/501,144

(22) Filed: Sep. 30, 2014

(65) Prior Publication Data

US 2015/0020046 A1 Jan. 15, 2015

Related U.S. Application Data

(63) Continuation of application No. 13/741,788, filed on Jan. 15, 2013, now Pat. No. 9,069,647.

(51) Int. Cl.
*G06F 9/44* (2006.01)
*G06F 9/45* (2006.01)
(Continued)

(52) U.S. Cl.
CPC ............ *G06F 8/73* (2013.01); *G06F 8/10* (2013.01); *G06F 8/77* (2013.01); *G06F 11/3684* (2013.01);
(Continued)

(58) Field of Classification Search
CPC ............ G06F 11/3466; G06F 11/3476; G06F 11/3676; G06F 11/3684; G06F 8/10;
(Continued)

(56) References Cited

U.S. PATENT DOCUMENTS 5,617,568 A 4/1997 Ault et al.
6,342,907 B1 1/2002 Petty et al.
(Continued)

FOREIGN PATENT DOCUMENTS

CA 2680978 A1 4/2010
CN 101833507 B 12/2011
(Continued)

OTHER PUBLICATIONS

Frauke Paetsch et al., Requirements Engineering and Agile Software Development, 2003, [Retrieved on Oct. 5, 2016]. Retrieved from the internet: <URL: http://ase.cpsc.ucalgary.ca/uploads/Publications/PaetschEberleinMaurer.pdf> 6 Pages (1-6).*
(Continued)

*Primary Examiner* — Thuy Dao
*Assistant Examiner* — Anibal Rivera
(74) *Attorney, Agent, or Firm* — Cantor Colburn LLP; William A. Kinnaman, Jr.

(57) ABSTRACT

A computer-implemented method for generating user stories for a software product, includes collecting, by a processor, a plurality of requirements, creating, by the processor, a plurality of content space specification files that includes the plurality of requirements, processing, by the processor, the plurality of content space specification files to generate the user stories that are related to real time data of the software product, defining, by the processor, a content space, mapping, by the processor, the user stories to the content space and embedding, by the processor, the content space with the software product, wherein user stories include at least one of
(Continued)

real time log data, profile statistics data, and coverage metric self-reporting data.

12 Claims, 5 Drawing Sheets

(51) Int. Cl.
  *G06F 11/36* (2006.01)
  *G06F 17/30* (2006.01)
(52) U.S. Cl.
  CPC .... *G06F 11/3672* (2013.01); *G06F 17/30867* (2013.01)
(58) Field of Classification Search
  CPC ..... G06F 8/20; G06F 8/70; G06F 8/30; G06F 8/35; G06F 8/77; G06F 11/3672; G06F 7/76; G06F 17/30867
  See application file for complete search history.

(56) References Cited

U.S. PATENT DOCUMENTS

| | | | |
|---|---|---|---|
| 6,367,077 B1 | 4/2002 | Brodersen et al. | |
| 6,536,036 B1 | 3/2003 | Pavela | |
| 6,799,718 B2 | 10/2004 | Chan et al. | |
| 6,910,041 B2 | 6/2005 | Exton et al. | |
| 7,000,184 B2 | 2/2006 | Matveyenko et al. | |
| 7,127,707 B1 | 10/2006 | Mishra et al. | |
| 7,139,737 B2 | 11/2006 | Takahashi et al. | |
| 7,149,699 B2 | 12/2006 | Barnard et al. | |
| 7,210,066 B2 | 4/2007 | Mandava et al. | |
| 7,272,752 B2 | 9/2007 | Farchi et al. | |
| 7,467,198 B2 | 12/2008 | Goodman et al. | |
| 7,467,202 B2 | 12/2008 | Savchuk | |
| 7,503,037 B2 | 3/2009 | Banerjee et al. | |
| 7,509,626 B1 | 3/2009 | Barnes et al. | |
| 7,512,957 B2 | 3/2009 | Cohen et al. | |
| 7,530,057 B2 | 5/2009 | Babcock | |
| 7,555,742 B2 | 6/2009 | Iborra et al. | |
| 7,562,029 B2 | 7/2009 | Majd et al. | |
| 7,562,338 B2* | 7/2009 | Knutson | G06F 8/10 717/101 |
| 7,581,205 B1 | 8/2009 | Massoudi | |
| 7,587,636 B2 | 9/2009 | Tillmann et al. | |
| 7,752,606 B2 | 7/2010 | Savage | |
| 7,761,591 B2 | 7/2010 | Graham | |
| 7,778,899 B2 | 8/2010 | Scumniotales et al. | |
| 7,861,178 B2 | 12/2010 | Lui et al. | |
| 7,904,890 B1 | 3/2011 | Hsieh et al. | |
| 7,979,796 B2 | 7/2011 | Williams et al. | |
| 8,006,222 B2 | 8/2011 | Ruhe | |
| 8,032,860 B2 | 10/2011 | Piehler et al. | |
| 8,037,453 B1 | 10/2011 | Zawadzki | |
| 8,069,435 B1 | 11/2011 | Lai | |
| 8,104,018 B2 | 1/2012 | Chessell et al. | |
| 8,112,814 B2 | 2/2012 | Shimizu | |
| 8,347,263 B1 | 1/2013 | Offer | |
| 8,407,669 B2 | 3/2013 | Yee et al. | |
| 8,429,708 B1 | 4/2013 | Tandon | |
| 8,458,646 B2 | 6/2013 | Knutson et al. | |
| 8,566,779 B2 | 10/2013 | Sukhenko et al. | |
| 8,577,937 B1 | 11/2013 | Offer | |
| 8,645,341 B2* | 2/2014 | Salman | G06F 11/3672 707/695 |
| 8,645,907 B2 | 2/2014 | Jain et al. | |
| 8,701,078 B1 | 4/2014 | Holler et al. | |
| 8,707,248 B2* | 4/2014 | Sawant | G06F 8/35 717/104 |
| 8,875,088 B1 | 10/2014 | Holler et al. | |
| 2001/0013024 A1 | 8/2001 | Takahashi et al. | |
| 2002/0016953 A1 | 2/2002 | Sollich | |
| 2002/0111808 A1* | 8/2002 | Feinberg | A63H 3/28 704/270.1 |
| 2002/0149614 A1 | 10/2002 | Biebesheimer et al. | |
| 2002/0165912 A1 | 11/2002 | Wenocur et al. | |
| 2002/0178360 A1 | 11/2002 | Wenocur et al. | |
| 2002/0194483 A1 | 12/2002 | Wenocur et al. | |
| 2002/0194501 A1 | 12/2002 | Wenocur et al. | |
| 2002/0199001 A1 | 12/2002 | Wenocur et al. | |
| 2002/0199096 A1 | 12/2002 | Wenocur et al. | |
| 2003/0009694 A1 | 1/2003 | Wenocur et al. | |
| 2003/0041110 A1 | 2/2003 | Wenocur et al. | |
| 2003/0056173 A1 | 3/2003 | Copenhaver et al. | |
| 2003/0093716 A1 | 5/2003 | Farchi et al. | |
| 2003/0121011 A1 | 6/2003 | Carter | |
| 2004/0025166 A1 | 2/2004 | Adlung et al. | |
| 2004/0143811 A1 | 7/2004 | Kaelicke et al. | |
| 2004/0204970 A1 | 10/2004 | Boden et al. | |
| 2005/0039045 A1 | 2/2005 | Wheeler | |
| 2005/0044197 A1 | 2/2005 | Lai | |
| 2005/0055399 A1 | 3/2005 | Savchuk | |
| 2005/0097193 A1 | 5/2005 | Rhoda et al. | |
| 2005/0114331 A1 | 5/2005 | Wang et al. | |
| 2005/0114771 A1 | 5/2005 | Piehler et al. | |
| 2005/0114830 A1* | 5/2005 | Knutson | G06F 8/10 717/102 |
| 2005/0144529 A1 | 6/2005 | Gotz et al. | |
| 2005/0160405 A1 | 7/2005 | Lunia et al. | |
| 2006/0036935 A1 | 2/2006 | Warner et al. | |
| 2006/0150200 A1 | 7/2006 | Cohen et al. | |
| 2006/0183085 A1 | 8/2006 | Amit et al. | |
| 2006/0190922 A1 | 8/2006 | Chen | |
| 2006/0230410 A1 | 10/2006 | Kurganov et al. | |
| 2006/0287959 A1 | 12/2006 | Blecken | |
| 2007/0005300 A1 | 1/2007 | Haggerty et al. | |
| 2007/0006160 A1 | 1/2007 | Kunz et al. | |
| 2007/0156420 A1* | 7/2007 | Meier | G06Q 10/06 703/22 |
| 2007/0156693 A1 | 7/2007 | Soin et al. | |
| 2007/0168918 A1 | 7/2007 | Metherall et al. | |
| 2007/0250815 A1 | 10/2007 | Bendapudi et al. | |
| 2008/0027742 A1 | 1/2008 | Maeda | |
| 2008/0034015 A1 | 2/2008 | Behnen et al. | |
| 2008/0066071 A1 | 3/2008 | Jain et al. | |
| 2008/0102422 A1 | 5/2008 | Hayes et al. | |
| 2008/0120602 A1 | 5/2008 | Comstock et al. | |
| 2008/0148253 A1 | 6/2008 | Badwe et al. | |
| 2008/0229278 A1 | 9/2008 | Liu et al. | |
| 2008/0244557 A1 | 10/2008 | Yeung et al. | |
| 2008/0263505 A1 | 10/2008 | StClair et al. | |
| 2008/0270981 A1 | 10/2008 | Hutchison et al. | |
| 2009/0031286 A1 | 1/2009 | Yee et al. | |
| 2009/0037912 A1 | 2/2009 | Stoitsev et al. | |
| 2009/0119779 A1 | 5/2009 | Dean et al. | |
| 2009/0259985 A1 | 10/2009 | Knutson et al. | |
| 2009/0271319 A1 | 10/2009 | Bromley et al. | |
| 2009/0271760 A1 | 10/2009 | Ellinger | |
| 2010/0169862 A1 | 7/2010 | Wolf et al. | |
| 2010/0180258 A1 | 7/2010 | Takahashi | |
| 2010/0228683 A1 | 9/2010 | Ansley et al. | |
| 2010/0251379 A1 | 9/2010 | Myers et al. | |
| 2010/0269095 A1 | 10/2010 | King et al. | |
| 2010/0313179 A1 | 12/2010 | Groves et al. | |
| 2011/0061047 A1 | 3/2011 | Tyamagondlu et al. | |
| 2011/0066420 A1 | 3/2011 | Bassin et al. | |
| 2011/0088014 A1 | 4/2011 | Becker et al. | |
| 2011/0131134 A1 | 6/2011 | Ferris et al. | |
| 2011/0131315 A1 | 6/2011 | Ferris et al. | |
| 2011/0138358 A1 | 6/2011 | Rau et al. | |
| 2011/0154378 A1 | 6/2011 | Kishan et al. | |
| 2011/0239227 A1 | 9/2011 | Schaefer et al. | |
| 2011/0246540 A1* | 10/2011 | Salman | G06F 11/3672 707/812 |
| 2011/0264649 A1 | 10/2011 | Hsiao et al. | |
| 2011/0289475 A1* | 11/2011 | Sukhenko | G06Q 10/0631 717/103 |
| 2011/0295701 A1 | 12/2011 | Phan | |
| 2012/0005209 A1 | 1/2012 | Rinearson et al. | |
| 2012/0005692 A1 | 1/2012 | Bulko et al. | |
| 2012/0011455 A1 | 1/2012 | Subramanian et al. | |
| 2012/0054250 A1 | 3/2012 | Williams et al. | |
| 2012/0158527 A1 | 6/2012 | Cannelongo et al. | |

(56) References Cited

U.S. PATENT DOCUMENTS

| | | | |
|---|---|---|---|
| 2012/0158669 A1 | 6/2012 | Morsi et al. | |
| 2012/0159441 A1* | 6/2012 | Ghaisas | G06F 8/10 717/123 |
| 2012/0174194 A1 | 7/2012 | Furukawa | |
| 2012/0210243 A1 | 8/2012 | Uhma et al. | |
| 2012/0246609 A1* | 9/2012 | Boden | G06F 7/76 717/101 |
| 2012/0246611 A1* | 9/2012 | Sawant | G06F 8/35 717/104 |
| 2012/0291010 A1 | 11/2012 | Hutchison et al. | |
| 2012/0304248 A1 | 11/2012 | Watts et al. | |
| 2012/0311003 A1 | 12/2012 | Kuznetsov et al. | |
| 2013/0024847 A1 | 1/2013 | Browne et al. | |
| 2013/0061200 A1* | 3/2013 | Roberts | G06F 8/10 717/100 |
| 2013/0216205 A1 | 8/2013 | Suri et al. | |
| 2013/0326637 A1 | 12/2013 | Fang et al. | |
| 2014/0013440 A1 | 1/2014 | Thakur et al. | |
| 2014/0053127 A1* | 2/2014 | Madison | G06F 8/30 717/103 |
| 2014/0123107 A1* | 5/2014 | Rajagopalan | G06F 11/3684 717/123 |
| 2014/0172514 A1* | 6/2014 | Schumann | G06Q 10/06393 705/7.39 |
| 2014/0172877 A1* | 6/2014 | Rubinstein | G06F 17/30867 707/748 |
| 2014/0201704 A1 | 7/2014 | Boden et al. | |
| 2015/0020053 A1 | 1/2015 | Boden et al. | |
| 2015/0324723 A1* | 11/2015 | Ben-Yehuda | G06F 8/77 717/101 |

FOREIGN PATENT DOCUMENTS

| | | | |
|---|---|---|---|
| JP | 2006195529 | A | 7/2006 |
| KR | 823227 | B1 | 4/2008 |
| WO | 2011031328 | A2 | 3/2011 |

OTHER PUBLICATIONS

Mike Cohn, User Stories Applied for Agile Software Development, Feb. 10, 2004, [Retrieved on Oct. 5, 2016]. Retrieved from the internet: <URL: http://www.mountaingoatsoftware.com/uploads/presentations/User-Stories-Applied-Agile-Software-Development-XP-Atlanta-2004.pdf> 63 Pages (1-63).*

European Examination Report for Application No. EP10776347.6-1957, dated Oct. 3, 2014, 6 pgs.

Leffingwell, "A Rally Software Development Corporation Whitepaper—Agile Software Development with Verification and Validation in . . . "; 2011, [retrieved Feb. 3, 2015]; retrieved fm internet <URL:http://www.ultertechnologies.com/docs/agile.pdf> 33 pgs.

Achim D. Brucker et al., "HOL-TestGen An Interactive Test-case Generation Framework,"; M. Chechik and M. Wirsing (Eds.): FASE 2009, LNCS 5503, pp. 417-420, 2009.

Anonymous, "Standardization for the Configuration of Heterogeneous Platforms Through Schema-Based Platform Tag Definitions", IP.com IPCOM000020720D, Dec. 10, 2003, pp. 1-5.

Huaikou Miao et al., "An Approach to Generating Test Cases for Testing Component-based Web Applications,"; Workshop on Intelligent Information Technology Application, Dec. 2-3, 2007, p. 264-269.

IBM, "Method and System for Dynamically Unloading and Loading Software Applications from a Peer-to-Peer Platform", IP.com IPCOM000193302D, Feb. 18, 2010, pp. 1-3.

International Search Report and Written Opinion: International Application No. PCT/IB2014/058076, International filing date: Jan. 6, 2014; Date of mailing Apr. 21, 2014; 10 Pgs.

L. Chung et al., "On Non-Functional Requirements in Software Engineering," Lecture Notes in Computer Science, v.5600, pp. 363-379, 2009.

Wei Yu, "Refactoring Use Case Models on Episodes," Thesis, Dept. of Computer Science, Concordia Univ., Montreal, Quebec, Mar. 2004; 97 pgs.

Yara, P, et al. "Global Software Development with Cloud Platforms", Gotel, O. et al. (eds): Seafood 2009, LNBIP 35, pp. 81-95, 2009.

Cohn, Mike "User Stories Applied for Agile Software Development", Feb. 10, 2004 (retrieved on Jul. 6, 2016 from the internet); ,URL: http//www.mountaingoatsoftware.com/uploads/presentations/User-Stories_Applied-Agile-Software-Development-XP-Atlanta-2004.pdf; 63 pgs. (1-63).

Larman et al., "Practices for Scaling Lean & Agile Development", Book, Jan. 7, 2010 (Retrieved on Jul. 6, 2016, Internet address: <URL: http://www.craiglarman.com/wiki/downloads/misc/book; 7 pgs. (181-186).

* cited by examiner

LOGGING AND PROFILING CONTENT SPACE DATA AND COVERAGE METRIC SELF-REPORTING

DOMESTIC PRIORITY

This application is a continuation application of the legally related U.S. Ser. No. 13/741,788 filed Jan. 15, 2013, the contents of which are incorporated by reference herein in their entirety.

BACKGROUND

The present invention relates to software development, and more specifically, to systems and methods for logging and profiling content space data and self-reporting for coverage metrics into a software product for use at run-time of the software product.

As part of developing products and applications, particularly software products and applications, requirements are determined, usually from a wide variety of sources, such as stake-holders, strategy people, customers, marketing, industry trends, standards organizations, and more. Through various channels, a detailed technical plan of activities for the software development team is derived from the requirements, which can interact in complex ways. The process of generating detailed implementation plans from requirements is subject to errors from various sources. Multiple concurrent dialogs among teams, making assumptions and decisions in parallel, can propagate errors, which can become built into the project plans and the product architecture and or designs. As such, business results such as time to market, development cost, product viability to compete in the marketplace, and the like can affected.

Use cases (user stories) have long been implemented to organize and itemize requirements for software products or application software. Use cases bridge the gap between business and market knowledge, and system design, by focusing on the user interactions with the system. The breakdown of requirements into use case or line items frequently occurs in parallel with, and is in dialog with, the architects and design leaders. During the time frame that requirements are collected and analyzed, the requirements are subject to change which must be reflected in the line items or use cases. In addition, new requirements are brought up and must be analyzed and fit with the existing line items or use cases. Some requirements are eliminated, with corresponding impacts on line items or use cases.

User stories can be a basis for development sprint planning and status tracking, and the basis for a key functional verification test (FVT) quality metric call 'content coverage'. Several usage scenarios can be presented in user story form. For example, product owners are interested in what user stories are being executed the most in the field, so that they can focus usability enhancements to those stories. Development technical leaders are interested in what user stories are taking the most time in the field (i.e., time per story multiplied by execution frequency), so that they can focus performance improvements on those stories and deliver measurable dollar-value to customers. Project managers are interested in what user stories are encountering defects the most in the field (i.e., defects per story multiplied by execution frequency), so that they can focus quality improvements on those stories. Test leads are interested in what user stories are getting good coverage in the field, so they can prioritize my testing on the less used stories. Lead IT are interested in what user stories are being used most, and how long they are cumulatively taking, so that they can monitor how the time of the IT Staff is being spent. FVT leads are interested in the content coverage metric with splits by platform, by interface and so on, that is reliable and highly automated so my test engineers don't have to spend time collecting the data for dashboards.

SUMMARY

Exemplary embodiments include a computer-implemented method for generating user stories for a software product, the method including collecting, by a processor, a plurality of requirements, creating, by the processor, a plurality of content space specification files that includes the plurality of requirements, processing, by the processor, the plurality of content space specification files to generate the user stories that are related to real time data of the software product, defining, by the processor, a content space, mapping, by the processor, the user stories to the content space and embedding, by the processor, the content space with the software product, wherein user stories include at least one of real time log data, profile statistics data, and coverage metric self-reporting data.

Additional exemplary embodiments include a computer program product for generating user stories for a software product, the computer program product including a computer readable medium storing instructions for causing a computer to implement a method. The method includes collecting, by a processor, a plurality of requirements, creating, by the processor, a plurality of content space specification files that includes the plurality of requirements, processing, by the processor, the plurality of content space specification files to generate the user stories that are related to real time data of the software product, defining, by the processor, a content space, mapping, by the processor, the user stories to the content space and embedding, by the processor, the content space with the software product, wherein user stories include at least one of real time log data, profile statistics data, and coverage metric self-reporting data.

Further exemplary embodiments include a computer-implemented method for generating user stories for a software product, the method including collecting a plurality of requirements, defining a content space including a plurality of cells, each cell defining an agile story, each cell having a plurality of dimensions, creating a plurality of content space specification files that includes the plurality of requirements, defining a content space, traversing at least one dimension of each of the plurality of cells to generate a user story related to real time data of the software product, mapping the user story to the content space, embedding the content space with the software product and generating reports defining the user story, wherein user story includes at least one of real time log data, profile statistics data, and coverage metric self-reporting data Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
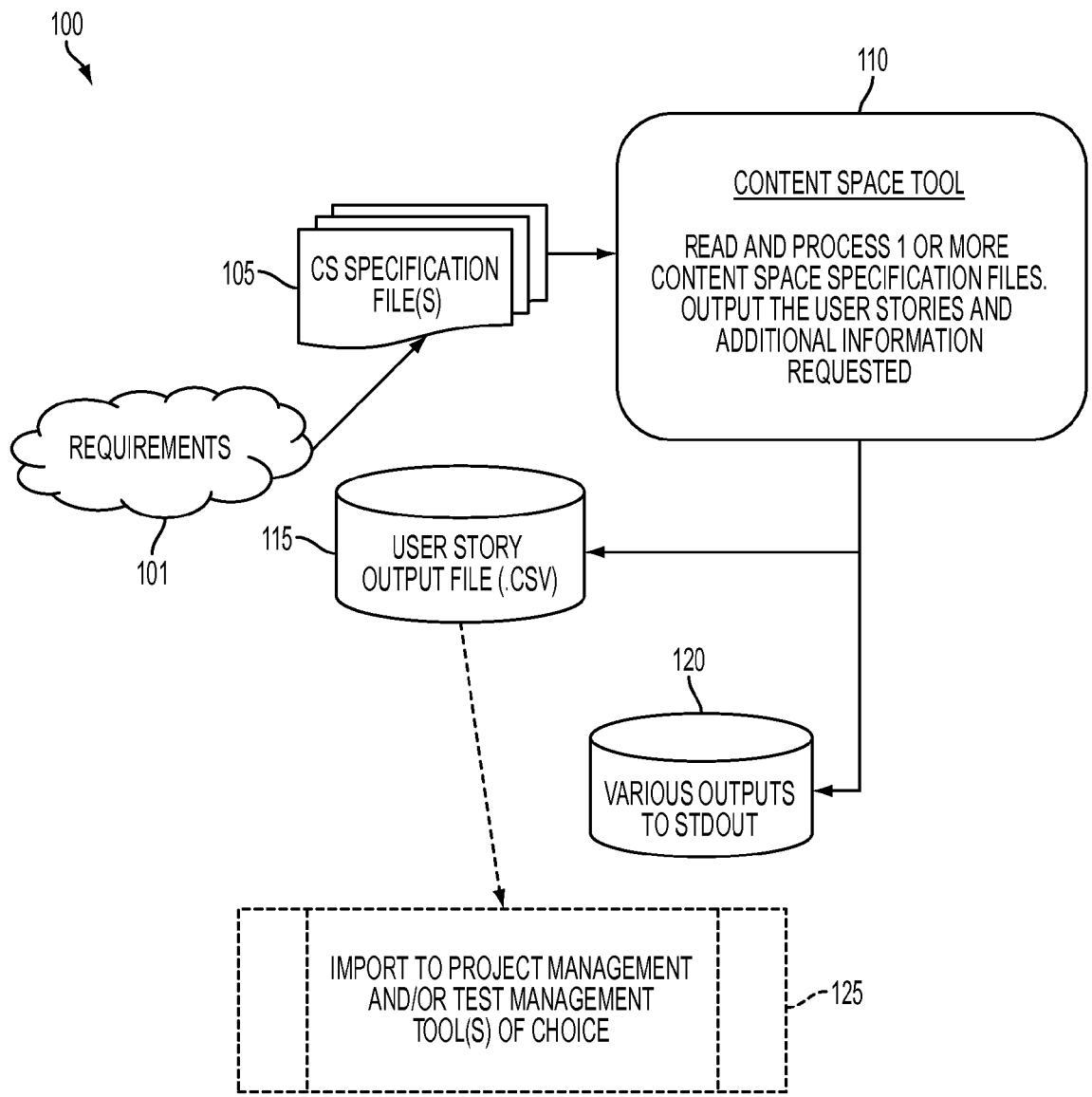
FIG. 1 illustrates a high level block diagram of a system for generating agile user stories into a content space, which then is implemented for logging and profiling content space data and coverage metric self-reporting.

In exemplary embodiments, the systems and methods described herein generate user stories that facilitate moving user story information in logs and error messages to be used by customers and analysis, and moving profile information for customer review. In exemplary embodiments, the systems and methods described herein provide administrative tools to monitor and visualize user story data for usage of a software product. The administrator can pass the data on to a particular company for inclusion in the agile process without confidentiality concerns. In exemplary embodiments, the saved user story data can be in a form including but not limited to: a log file; a database and files. Regardless of the form, each form includes timestamps or interval measurements, so that users can analyze not only the frequency of each story, but also the mean time or cumulative time for each story.

In exemplary embodiments, the systems and methods described herein include an internal representation of a software product's own user stories (generated via a content space) with interfaces for internal access. The internal representation ships with the software product. When there is an error log entry associated with the software product, an error message or first-failure data capture (FFDC) data is to be generated, and the content space coordinates for user stories relevant, are included with log or message data. The user story data is then included in the content space when it is sent to the respective company. In exemplary embodiments, this data is included in defects, as appropriate, for later analysis. In addition, for any given log entry, message, and the like, multiple user stories may be relevant and are supported in the content space.

In exemplary embodiments, the system and methods described herein support profiling by collecting execution counts and duration data as execution occurs in the customer installation. This data is saved with associated indexes to map it to user stories. In addition, customers are provided with tools (e.g., user interfaces) to view and perhaps export this data, and request and view analysis.

In exemplary embodiments, the systems and methods described herein support content coverage metrics by tools to reset parts of the profile data and extract (perhaps via command line interface (CLI)) the base data after tests have been executed. The exported data allows direct calculation of content coverage metrics with necessary splits.

As described herein, a content space model is implemented for not only collecting requirements and generating user stories but also for logging and profiling content space data and coverage metric self-reporting for a software product. A content space is a way of representing software content from an outside-in perspective via a set of dimensions. Each of the content space dimensions has values defined in terms of the software itself that concern a particular aspect, such as information abstraction, function, external interface and run-time environment. The dimension values can represent existing content and also new content for the software, based on requirements (via content space analysis) for a new release. The content space can be programmatically traversed, and as this traversal occurs, end-to-end testable units (termed user stories) are output, each corresponding to a particular region of the content space and having content space coordinates. The set of all output user stories partitions the software content and the set of all new and changed user stories partitions the release requirements. The set of all user stories and various subsets (e.g., all Power user stories) are used to compute the content coverage metric of various scopes.

An example of how a content space can be set up and implemented is now discussed. It will be appreciated that the following example is illustrative of a content space and not limiting.

In exemplary embodiments, the content space can be a five-dimensional space (termed either as a 'software product content space' or a 'content space'), such that each cell within the content space is an end-to-end use case (i.e., agile user story). In exemplary embodiments, the systems and methods described herein can be implemented at various levels of scale, from individual software components to very large products comprising hundreds of components to include in the content space and for logging and profiling content space data and coverage metric self-reporting for the software product. The five dimensions structure the work as needed by software development (i.e., design, test, project management), and the requirements serve to define the values used on the dimensions. As such, the exemplary content space servers to bridge the requirements domain and implementation domain.

FIG. 1 illustrates a high level block diagram of a system 100 for generating agile user stories into a content space, which then is implemented for logging and profiling content space data and coverage metric self-reporting. The system 100 outlines and overviews the exemplary methods, the blocks for which are described further herein. It will be appreciated that each of the summary details described herein includes multiple users from each of the two domains, with multiple reviews. The order in which the individual steps are executed is not necessarily serial. Changes in requirements or additional insights happen during a later step can necessitate reworking the results from an earlier step.

In exemplary embodiments, content space specification files 105 are generated from the various sources in the requirements domain as described herein. As described further herein, the content space specification files are generated from various requirements 101. A content space tool 110 receives the content specification files 105 to automatically generate the agile user stories that can be stored in a user story storage medium 115. An additional storage medium 120 can be implemented to store changes to the specification files 105, or any other suitable output during the content space generation. Once generated, the agile user stories can be output to any suitable project management or test management tool 125 implemented by the users in the development domain.

The system 100 includes several functions, including, but not limited to: 1) articulating the content space; 2) classifying regions of the content space; 3) grouping the regions of the content space; 4) assigning priorities to use cases; and 5) loading the project management tool 125.

In articulating the content space, requirements are analyzed in terms of the five content space dimensions. This analysis results in (with iteration and consensus building) a definition of values for each of the five dimensions, which is represented in a form that can be programmatically processed. In articulating the content space, the systems and methods described herein address whether all the requirements are represented in the content space, whether each content space dimension value is properly defined and agreed upon, and whether all the dimension values are related to explicit, implicit or future requirements.

In classifying the regions of the content space, once the team is satisfied that the content space is defined (i.e., all dimension values known, understood, and reasonably well-defined) and that it does encompass all the requirements for a selected time-frame, the team next decides on how to classify regions of the content space. Through automated systems with team decisions, every cell in the content space is categorized in a variety of types, including, but not limited to: 1) does not apply to the product; 2) does apply to the product but for some future release; 3) is part of the product today (or from some prior release) and has no enhancements or changes; 4) is part of the product today and is enhanced or changed in some way; and 5) is a new or an enhanced function. The systems and methods described herein determine whether each content space dimension value is classified, and reviews of the results determine correctness.

Following agreement on the content space and categorization of regions, the content space regions are then grouped. Subsets of the content space are grouped together into a size which is desirable for project management and the scale of the product and teams. This step applies particularly to the content space regions classified as unchanged and new or enhanced (changed). The two extremes are: an entire content space can grouped into a single output project management work item; or, at the other extreme, every single content space cell can be output as a single project management line item. Essentially every possible grouping in between these extremes is also supported. Typically used are grouping all new and changed user stories for a particular platform or grouping specific sub-variations of a verb.

In exemplary embodiments, there is flexibility in how these regions are selected and how they related to the content space cell classifications. The systems and methods described herein determine whether the grouping is correct and do the groupings properly reflect the tradeoff between project management needs and technical visibility based on classifications and complexity.

The grouping of content space cells into right sized project management work items mostly focused on a new function and an existing and unchanged function. The user (team) can programmatically select the grouping of content space cells based on many considerations such overall content space size, product size, degree of technical difficulty of new function, team size, number of team, and the like. In exemplary embodiments, individual content cells are use cases (with adjustable granularity) and the groupings are user functions or user stories.

Based on the relative priorities of requirements, regions of the content space (subsets of use cases) are assigned priority values. These can be used to help focus review sessions to ensure the right higher priority content is defined. When loaded into a project management application, the priorities can be used directly by development in agile sprint (iteration) planning. The output project management work items are input (e.g., 'import') for example, from the user story storage medium 115, into an appropriate project management tool 125.

As described herein, a content space can be defined by five dimensions. In exemplary embodiments, the five dimensions of the content space are, in order: release (time); noun; verb; interface; and platform. The three dimensions, verb, interface and platform, are orthogonal and noun-specific. That is, an instance of these (e.g., a verb set, an interface set and a platform set) is defined for each noun of interest. Nouns are the fourth dimension. The combination of a noun and its associated 3D space is termed a 'noun space'. A set of noun spaces at a given point in time (usually associated with product release) constitute the definition of the content space for a particular release of a product (when the point in time is chosen on a release calendar boundary). Instances a product content space for multiple releases represent the fifth dimension of content space: time.

For illustrative purposes, an example of a software product, a hypothetical browser-based email client is discussed for ease of discussion. It will be appreciated that other products are contemplated for which logging and profiling content space data and coverage metric self-reporting can be implemented.

Figure 2:
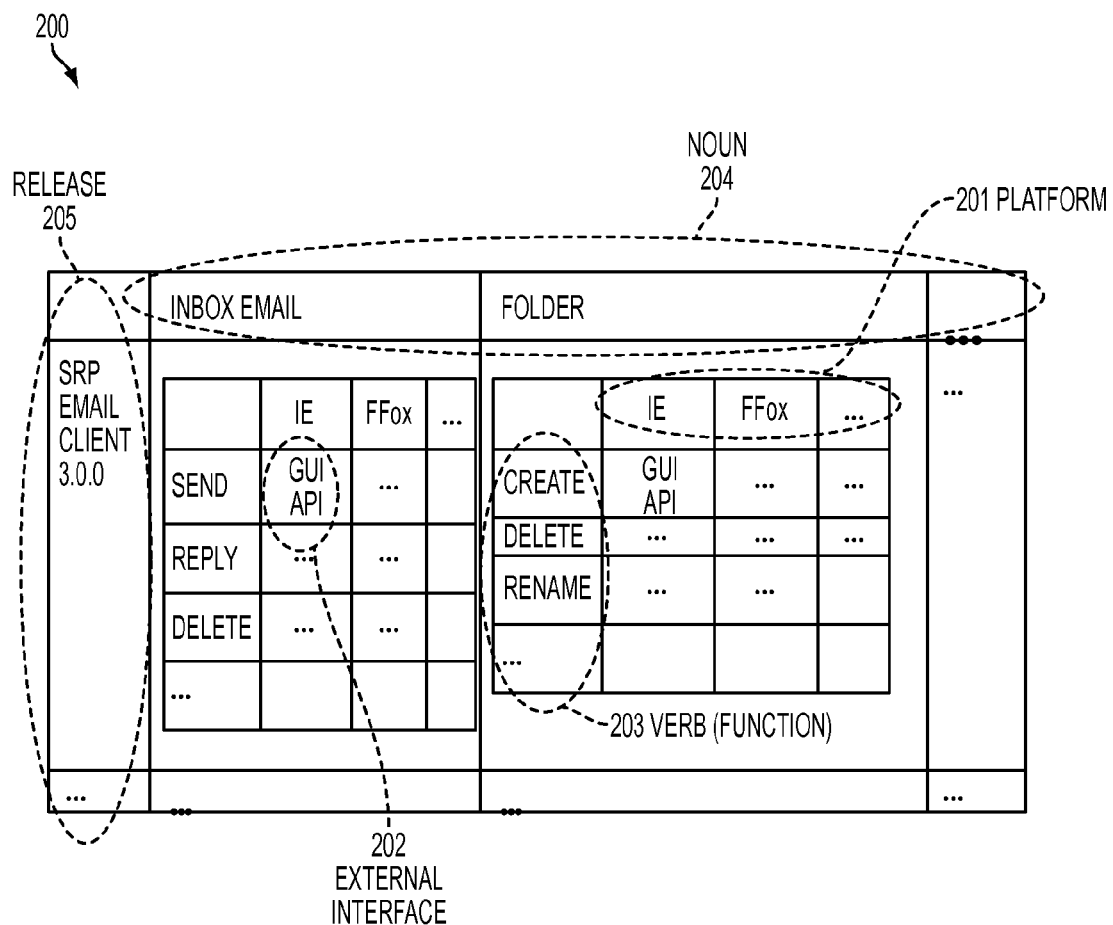
FIG. 2 illustrates a chart representation of the five exemplary dimensions described herein.

FIG. 2 illustrates a chart 200 representation of the five exemplary dimensions described herein. As described herein, the five dimensions of the content space are, from inner three to out-most: platform 201; interface 202; verb 203; noun 204; and release (time) 205. All of the values for the dimensions are derived from the product requirements, either explicit or implicit.

The platform dimension 201 is interpreted broadly to include the hardware, operating system, middle ware, hypervisor, and language runtime in which the product executes. Generally, meaningful platform elements are determined by each product. As such, the entire prerequisite software stack and hardware is considered. Values of the platform dimension 201 can include specific releases of each of these platform components as needed, or can be more generally specified. For example, a platform might be AIX 5.2 or just AIX. Alternatively, the platform might be Firefox 3.6 or better, or just Firefox. Values can include as needed ancillary hardware for storage, networking, hardware management controllers, firmware, etc. for the full functional system configuration.

The interface dimension 202 has values chosen to identify and separate the kinds of interfaces that the subject software presents to external entities; people, other software or hardware. The values can be specified by type such as Graphical User Interface (GUI), command line interface (CLI), and so on. The values can include programmable interfaces such as web services (e.g. REST) and APIs. Protocols can also be specified as values (e.g., IPv6 or MPI (Message Processing Interface) used in super-computing environments).

The verb dimension 203 includes values such as functions or operations that are supported by the subject software for a particular noun. The operations may be specified at varying levels of granularity, depending upon the needs of a given set of requirements. For example 'copy' or 'create' might be sufficient. More fine-grained values such 'copy to like repository' and 'copy to new folder' can also be used. The decision depends on considerations like how new the function is, or how critical the different forms of copy are to the product stake-holders (those that define requirements), or how technically difficult to implement.

The noun dimension 204 is an abstract entity presented to externals via the interface(s). Most software for direct use by people has a number of such abstractions that people manipulate via the functions (verbs) presented by the software. Example nouns for an email client can include, but are not limited to: inbox; inbox email; folder; and draft email. As with values on the above dimensions, there is flexibility in how coarse-grained or fine-grained the nouns are defined. The right level of noun dimension granularity for a given product and given release depends on the requirements.

The time dimension 205 values include natural values (i.e., discrete units) which are the releases planned for the product. The content space for release n+1 can be various additions and changes relative to the release n content space. These additions, enhancements and other changes affect the release n content space by changing the values defined on the various dimensions. New nouns, new verbs, new platforms, can all be added. Enhancements to exiting nouns and verbs are common and defined explicitly in the n+1 content space.

Because of the way the dimensions are defined, each generated user story is an end-to-end testable unit of function (sometimes termed 'FVT-able', where FVT=Function Verification Test). For example, for an "email" client each user story is a cell in the five-dimensional space with coordinates of release, noun, verb, interface and platform. For example, "send an email on Firefox via GUI release n" is represented by a 5-tuple {release n, email, send, GUI, Firefox}, as shown in FIG. 2.

Figure 3:
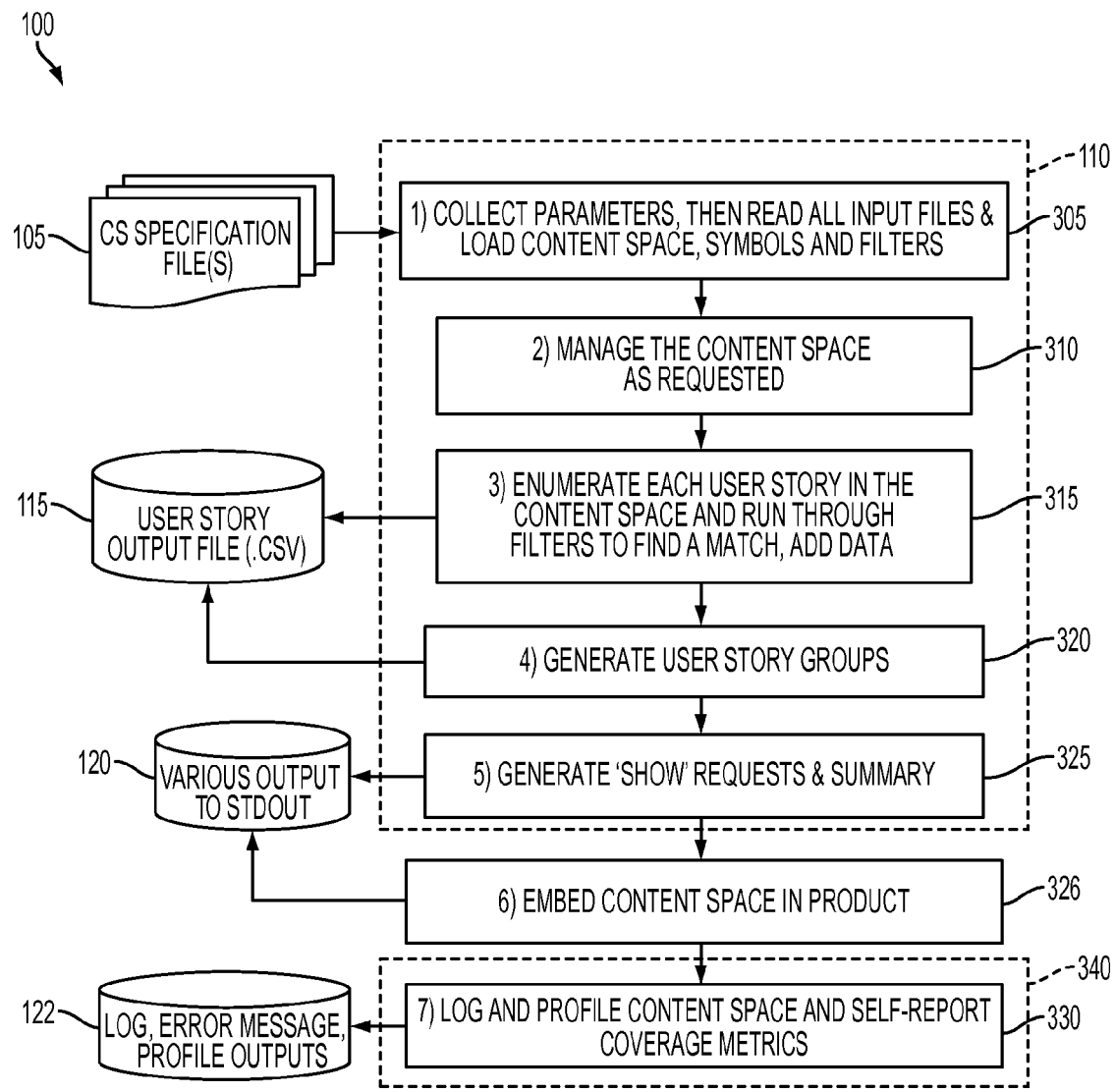
FIG. 3 illustrates the system for logging and profiling content space data and coverage metric self-reporting of FIG. 1, further illustrating the content space tool process flow that defines implementation of content space data.

FIG. 3 illustrates the system 100 for logging and profiling content space data and coverage metric self-reporting of FIG. 1, further illustrating the content space tool 110 process flow that defines implementation of content space data. In exemplary embodiments, parameters are collected from the content space specification files 105 at block 305. In addition, any input files and content space symbols and filters are also read into the content space tool 110. As such, following invocation and initialization of the content space tool 110, the content space specification file(s) 105 are read. In addition, the content space specification files 105 are parsed for correctness and various checks are run to help ensure consistency across the possibly multiple files. This processing includes all the symbols and filters. At block 310, the content space is managed. In exemplary embodiments, grouping and folding are techniques to manage content space size. The size of a content space is naturally expressed as the number of user stories it contains, or will output if requested. For example, in software products, content space sizes in range of hundreds to tens of thousands. Average sizes can be in the range of two thousand to twenty thousand. Both folding and grouping can manage content space size without eliminating (or hiding) detail that needs to be visible from the user story output file(s) 115.

In grouping user stories, a set of user stories is represented in output as a single user story. For example all the user stories for platform ABC or for function XYZ might be represented by a single output user story. Grouping does not change the size of a content space. Grouping allows the number of output user stories to be directly managed without eliminating any details from the CS specification. There is no limit on the size of a user story group. In exemplary embodiments, grouping is controlled by the user by filters in the content space specification file 105.

As filtering occurs, when a filter matches a user story and the filter has any kind of grouping requested, save the user story is saved in a buffer associated with the filter. After all filtering and all non-grouped user stories are output. The content space tool 110 loops through all the filters that have any kind of grouping. For each filter, the content space tool 110 performs several steps. First, if a simple 'group' is requested in the filter, the content space tool 110 generates the single grouping user story, summary field, description field, and the like, and writes to output. The content space tool 110 then continues to the next filter. If a type of 'group by' is requested, then for each group by element (e.g., noun, verb, ifc, platform), the content space tool 110 builds subsets of the respective values on the dimension from among the buffered user stories. The content space tool 110 then generates a single user story group for each cross-dimension subset, generates the description field that itemizes the subset of user stories for the group, and writes the user story group.

Folding also reduces the number of output user stories like grouping. But in contrast to grouping, folding reduces the size of the content space. Folding reduces the size of the content space by collecting some number of dimension element values into a single value (folding operates on the content space itself while grouping operates on user stories). The resulting single value is then used as a dimension element value in place of the multiple collected values, thereby reducing the size of the content space. The single resulting value is termed a folding symbol ('fold sym').

As described herein, folding does not eliminate the details from the content space specification file. The values collected into a fold sym remain in the content space specification file 105, and the folding done by the fold sym can be toggled on or off. The value-folding can be switched on and off for each of the noun, verb, interface and platform dimensions independently or all four dimensions together. Hence not only are the values still in the spec file, but the content space can also be processed again and user stories generated without folding or different folding, to see the detail. Folding can include both dimension folding and value folding.

In exemplary embodiments, the content space tool 110 processes command line parameters to determine what kinds of folding are requested. If no fold parameter, the content space tool 110 implements the default setting for folding. As the content space specification files 105 are read, the content space tool 110 collects a list of all fold syms, and values for each. After all the noun spaces are read from input files, the content space tool 110 invokes a fold function. The content space tool implements dimension folding first if requested. For each dimension for which folding is requested, the dimension is folded to "*" in each noun space. If value folding is requested for any dimensions that have not been folded, the following steps are implemented. If noun value folding, the content space tool 110 folds the noun values by removing nouns in value list of a fold sym and replace with single instance of the fold sym. For each (remaining) noun space, for each relevant dimension, the content space tool 110 check each dimension value to see if it is in the value list of a fold sym. If the noun is in the value list of the fold sym, then the content space tool 110 removes the value and adds the fold sym (once only) to the dimension list. If folding has been set off, the content space tool 110 takes no action. The content space by default is loaded in this mode. If fold request for the 'all' or similar, the interface and platform dimensions are folded (as above) and the verb dimension is value-folded for all noun spaces are folded, and the noun dimension is value-folded.

Referring still to FIG. 3, at block 315, each user story is enumerated in the content space and run through filters to classify and possibly add data. At block 320, the user story groups are generated and at block 325 show requests and a summary are generated and can be stored in the output 120. At block 326, the content space is embedded in the software product as described herein. At block 330, the content space data is logged and profiled and coverage metrics are self-reported as described further herein. The system 100 can include an output 122 to store the log and error message profile outputs, which is part of the customer environment. In exemplary embodiments, block 330 occurs in the software product runtime. In addition, the embedding of the content space occurs outside of the content space tool 110. The embedding occurs as part of the build of the software product. In exemplary embodiments, the system 100 further includes the runtime environment 340 of the software product. In exemplary embodiments, the embedding of the content space at block 326 occurs outside of the content space tool 110 as described herein, and also occurs outside of the runtime environment 340 of the software product. In exemplary embodiments, the runtime environment 340 is as experienced by the customer that uses the product, in whatever hardware or device the software runs.

In exemplary embodiments, a content space is specified in a form that is processed (read) by the content space tool 110 (e.g., an agile user story generation program). The specification can be split among multiple files (e.g., the content space specification files 105), which can be processed individually or together. As such, an overall product content space can be split among some number of individual architects for parallel concurrent activity, and then processed as a whole.

In exemplary embodiments, each content space specification file 105 includes some number of noun spaces, defined symbols, and filters. A content space specification file 105 is used to define a content space in a form that can be processed programmatically. In exemplary embodiments, the specification file 105 is implemented to generate user stories and provide various kinds of statistics about the content space, enables content coverage metric, automated comparisons of multiple content spaces (e.g. cross-release), and the like. In exemplary embodiments, the content space specification file 105 includes several statements, which define, among other things, a noun space, that can include noun, verb, interface (ifc) and platform. A content space is a set of noun spaces. As such, a basic content space specification file defines one or more noun spaces. Descriptive names are used for the values on all these dimensions. In exemplary embodiments, additional statements can be added to the content space specification file 105. On statement is symbol (SYM) to simplify maintenance of the content space specification file 105 by reducing redundancy across noun space definitions. Another statement is a filter statement that is used to classify user stories, and to add information to output user stories. In exemplary embodiments, each instance of statements as a group, defines a single noun space. For example, the noun statement gives the noun space a name, and the other verb, interface and platform statements provide the values for which each dimension is named.

As further described herein, a sym statement is a simple mechanism to create a short-hand for a list of values. The short-hand can then be used in defining noun spaces (e.g., in 'noun', 'verb', 'ifc', 'platform' statements), in other sym statements, and in filter statements. This implementation of sym statements therefore simplifies use and later changes to the content specification file since the list of related values can reliably changed throughout a set of specification files by changing it in only a single place. For example, assume a content space has 15 noun spaces and 12 of those all use the same platform list. Then that list can defined once as a sym and that sym name used in the 12 noun spaces. The example illustrates a group of related syms that aggregates various example platforms. The sym 'all_email_env' is then used to in the definition of various noun spaces, for example in the 'draft email' noun space.

The symbols that end in a trailing '_' (underbar) are fold syms, as is the 'send_'. The '_' indicates a symbol that can be folded. If the relevant type of value folding is requested (e.g. verb value to fold verb dimension, or platform value to fold platform dimension) then the symbols marked with a trailing '_' are folded. That is, the symbol itself is used in the content space when folded. If not folded the symbol's value list is used in the content space. When folded a symbol is shown in generated user stories with the trailing '_' so that everyone seeing the user story will know it is folded (is an abstraction).

As further described herein, filter statements are used to classify user stories into one of five categories; n/a, future, nochange, changed or new. They also can add to a story a variety of information. A filter statement has the general structure: filter, <expression>, <classification>, <other requests>. The filter expression is a logical expression (i.e., evaluates to True or False) based on the language of the content the content space tool 110. For example, logical operators are supported (i.e., =, !=, >, <, in, not in, etc.) and the variables allowed are 'noun', 'verb', 'ifc', 'platform' and defined symbols (sym's). Other keyword-value pairs which may be included in a filter statement include but are not limited to: 1) Owner, owner name; 2) Group or Group by request; 3) Priority, priority value; 3) Testid, testid value; and 4) Tag, list of tag values. By default, filtering is done after all the content space specification files 105 have been read and after folding is performed. The content space tool 110 has an option to turn off all filtering which is useful at time to check the results of content space changes.

In exemplary embodiments, the content space specification files 105 can implement additional statements, including, but not limited to: 1) comment_off—used to end commented-out block of lines; 2) comment_on—used to start a block of comment lines. Starts skipping; 3) createdby—used to set the field 'Created By'; 4) csvfile—sets the name of the output .csv file; 5) eof—logically ends file early (rest of file skipped); 6) include—name a file to be included; 7) planned for—used to set the RTC field 'Planned For'; 8) scope—used to set filter scope to file (default) or global; 9) set_filterid_in_summaryfield—true or false (default); 10) set_implicit_folding—true or false (default); 11) set_summary_prefix_—Default is "User Story"; 12) set_summary_suffix—Default is category of the user story; 13) tag_exclusion_set—Define a mutually exclusive set of tags; and 14) title—title (label) of content space.

As described herein, the specification files 105 support the definition of symbols used in the defining the values and in the filters, that is, used within the content space specification file itself. This format helps maintain a content space specification by lessening duplication of constants (i.e., dimension values). This format also serves to help the specification file be self-documenting when description names are used for the symbols. For example, a list of platforms used in a prior release might be assigned to a symbol named 'prior_platforms'. This symbol is then used in the noun spaces as a short-hand for the full list. This symbol can also be used in the filters.

Each use case in a content space is classified using filters into basic categories including, but not limited to: not applicable, future, regression and development. "Not applicable" are use cases judged to likely never be relevant for the product and future are use cases not in the n+1 release but inherent in the content space. In exemplary embodiments, the content space is identified to clearly encompass the requirements to help ensure nothing is missed. In doing so, some use cases are likely to be generated that are not planned for the current release.

In exemplary embodiments, filters are also implemented to add information to the generated use cases. Examples of information that can be added are priority, tags, references to requirements document and the like.

In exemplary embodiments, filters are also implemented to cause sets of use cases to be grouped into a single, broader output use case. Implementing filters in this manner can be helpful in the case regression use cases where fine-grained management and tracking of the individual use cases is not necessary (e.g., due to the existence of automated testing built during previous releases).

In generating the agile use cases, one or more content space specification files 105 are read by the content space tool 110. As described herein, a primary output is the user story storage medium 115. In exemplary embodiments, the user story storage medium can have a comma separated value (.csv) file format, which is a quasi-standard widely used by many software applications. A second type of output is the additional storage medium 120 for various summary and report like information or in progress changes.

As described herein, content space data is logged and profiled and coverage metrics are self-reported at block 330, which is now described in further detail.

As described herein, the exemplary systems and methods support content space logging, profiling and self-reporting content coverage. With respect to logging, real time data related to actual user implementation in each software product, ties the functions implemented by the user to the content space with a GUI. Feedback can then be generated into the GUI showing how each of the functions of the software product has been used. In exemplary embodiments, the content space subdivides the software product, which then enables collection of data and statistics at runtime, which is mapped to the content space. With respect to profiling, given a noun or any set of features of the content space, the systems and methods described herein generate profile statistics for particular use cases. Since the software product recognizes its own content space, the products injects real time and real world performance data of the software product into the content space. With respect to content coverage, the systems and methods described herein measure the test completeness of the software product. As described herein, since the software product recognizes its own content space, the software product can track the content space as the product is being used in real time. As such, a user can inquire at any given time what part of the code (being represented by a user story in the content space) and what percentage of the code is being utilized.

Figure 4:
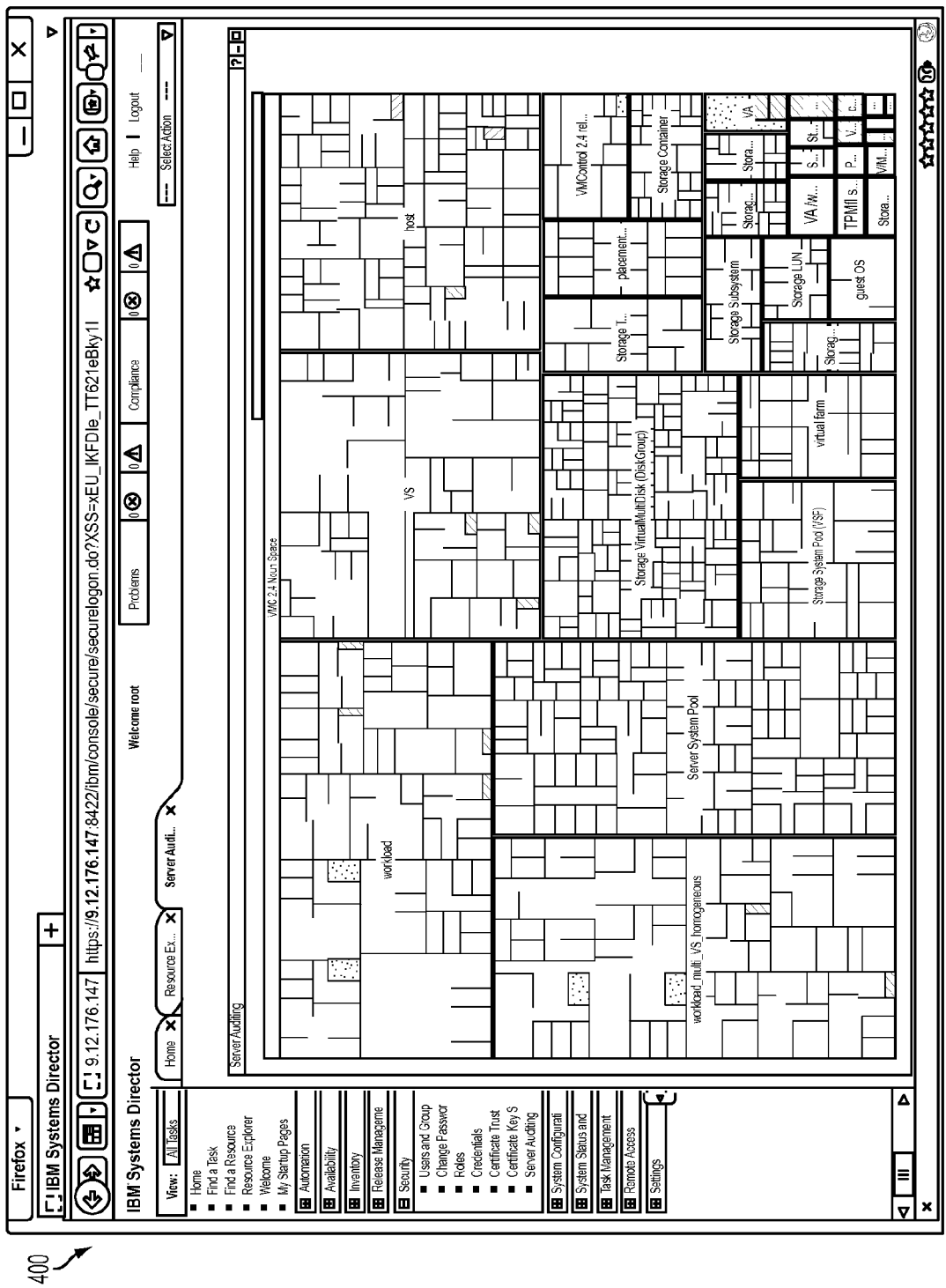
FIG. 4 illustrates a screen shot of a graphical user interface (GUI) that can be implemented by a user to view and navigate content space data as described herein.

FIG. 4 illustrates a screen shot of a GUI 400 that can be implemented by a user to view and navigate content space data as described herein. The example in FIG. 4 illustrates an interactive tree-map, although it will be appreciated that other user interfaces are contemplated in other exemplary embodiments. The user can therefore generate reports as a tree map as a type of auditing. The example illustrates "server auditing", although other names are contemplated. In exemplary embodiments, the tree-map on the example illustrates multiple named rectangles, each rectangle sized relative to the number of user stories the rectangle contains. In the example, the tree-map can include four levels. At the top level (shown) each large rectangle corresponds to a product resource which is familiar to the user as they work with the resources daily. In exemplary embodiments, color dimensions can be implanted for various implementations, such as but not limited to relative frequency of execution of a particular cell of the content space.

In exemplary embodiments, the user can click on a rectangle and zoom into that resource and see all the functions associated with it. Clicking again shows all the platforms, and the fourth level show the interfaces (GUI, CLI and REST). A right-click can zoom the tree-map up one level. At the leafs, the customer can click on various specific reports about that portions of the tree-map, which is a set of user stories. The user can then export the content space data and send it to the software company for metrics analysis.

In exemplary embodiments, the GUI 400 can show a log file with messages of user stories (Content Space coordinates) included. The user could use standard table sorting/filtering to see only the Content Space messages or only messages from a given story. As described herein, a user story (i.e., a region of the content space) is uniquely identified by its coordinates. The user story is the set of coordinate values on four dimensions for the story; noun, verb, interface, platform. (The fifth dimension of the content space is time, usually denoted by a product release and version. But for logging purposes the value on this dimension is not needed in the output.) Following the convention of coordinate order, the following illustrates example user story labeling that are supported in system or application logs (and in error messages):

---

{Virtual Appliance, deploy to Server System Pool, GUI, PowerVM with VIOS NG}
 {Virtual Server, suspend, REST, VMware}
 {Virtual Server, restart, *, KVM with SAN}
 {Virtual Appliance, capture new version, *, ?}

---

In this example, "*" indicates all coordinate value for that dimension, and "?" indicates not known. In exemplary embodiments, the content space can be shipped with the software product and available for fixes and release updates like the rest of the product. A standard wrapper is used so the product code can access the embedded user story information.

As described herein, the embedded content space can then be implemented (e.g., through the GUI 400 described with respect to FIG. 4) to log and profile user information and to measure test completeness (i.e. coverage metric self-reporting).

With regard to logging, the systems and methods described herein generate user stories that facilitate moving user story information in logs and error messages to be used by customers and analysis, and moving profile information for customer review. In exemplary embodiments, the systems and methods described herein monitor and visualize user story data for usage of a software product. The data can then be passed (e.g., via the content space) on to a particular company for inclusion in the agile process without confidentiality concerns. As described herein, the saved user story data can be in a form including but not limited to: a log file; a database and files. Regardless of the form, each form includes timestamps or interval measurements, so that users can analyze not only the frequency of each story, but also the mean time or cumulative time for each story. In this way the logging of the real time data for the users provides information regarding what the users are doing for a particular product, which ties the product function into the structure of the content space (i.e., a particular function is a user story). In turn, by implementing a GUI (e.g., the GUI 400 of FIG. 4), feedback can be entered showing how the data has been used. In exemplary embodiments, the content space sub-divides a product at runtime and collects the data and statistics, which are mapped to the content space. In addition, log entries are indexed by the content space.

The internal representation of a software product's own user stories (generated via a content space) provides an interface for internal access. The internal representation ships with the software product. When there is an error log entry associated with the software product, an error message or FFDC data is to be generated, and the content space coordinates for user stories relevant, are included with log or message data. The user story data is then included in the content space when it is sent to the respective company. In exemplary embodiments, this data is included in defects, as appropriate, for later analysis. In addition, for any given log entry, message, and the like, multiple user stories may be relevant and are supported in the content space.

With regard to profiling, the system and methods described herein collect execution counts and duration data as execution occurs in the customer installation. This data is saved with associated indexes to map it to user stories. In addition, the user can use a GUI (e.g., the GUI 400 of FIG. 4) to view and perhaps export this data, and request and view analysis. In exemplary embodiments, given a noun or any set of features of the content space, the systems and methods described herein generate profile statistics for particular use cases. Since the software product recognizes its own content space, the products injects real time and real world performance data of the software product into the content space. In exemplary embodiments, the content space sub-divides a product at runtime and collects the data and statistics, which are mapped to the content space. In addition, profile entries are indexed by the content space. In this way, when a user is implementing a software product, real time and real world uses of a particular function of the product are mapped to user stories which are then stored in the content space. As such, not only is the content space used to store user stories related to a particular function of the product, but is also used to store actual implementations of those functions as additional user stories. This real time and real world data is thus injected into the content space as performance data.

With respect to content coverage, the systems and methods described herein measure the test completeness of the software product. As described herein, since the software product recognizes its own content space, the software product can track the content space as the product is being used in real time. As such, a user can inquire at any given time what part of the code (being represented by a user story in the content space) and what percentage of the code is being utilized. The systems and method described herein reset parts of the profile data and extract the base data after tests have been executed, in order to self-report the data. The exported data allows direct calculation of content coverage metrics with necessary splits.

As described herein, to log and profile user information and to measure test completeness, the content space is embedded in the product when shipped. In exemplary embodiments, the systems and methods described herein embed a content space within a software product for availability for normal use at run-time, thus allowing the logging, profiling and metric coverage self-reporting described herein. In exemplary embodiments, the systems and methods described herein implement a content space represented internally, shippable and useable at run-time. In addition, the systems and methods described herein implement the internal interface for the software product's internal functional parts to access the content space at run time (e.g., an internal callable set of interfaces that are used by product code). The systems and methods described herein further obtain and set attributes to each cell in the content space. The attributes are used for various purposes by the run-time functions access content space. Some example attributes include, but are not limited to: 1) cell category; 2) cell requirements; 3) development owner; 4) test owner; 5) GUI panel ID; 6) instances needed, and the like. The systems and methods described herein further integrate a run-time content space within a normal software product build process. In addition, the systems and methods described herein update the content space definition within the software product after the software is installed (similar to updating other components of the software product).

Figure 5:
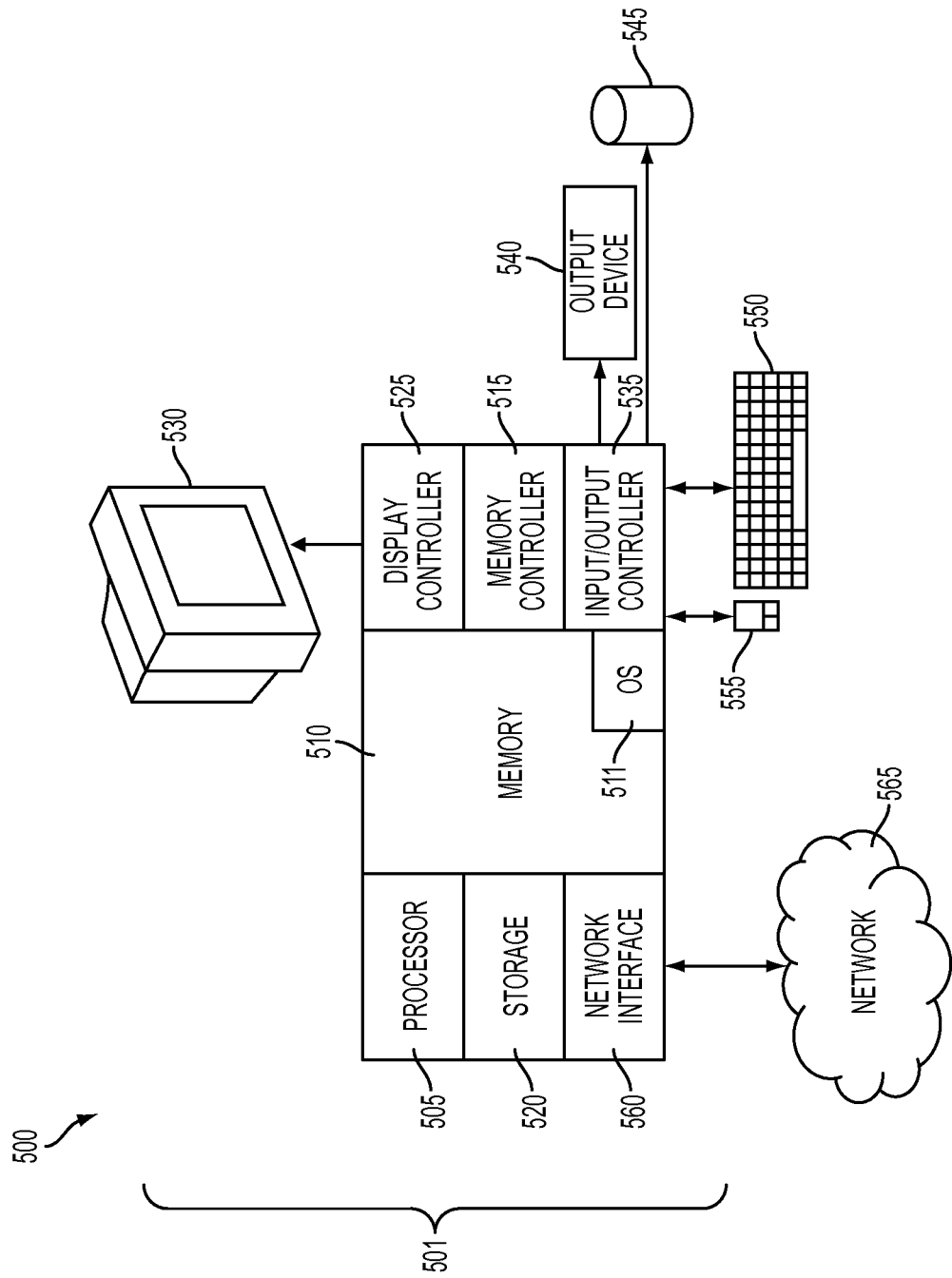
FIG. 5 illustrates an exemplary embodiment of a system in which content space logging and profiling and coverage metric self-reporting can be implemented.

The content space logging and profiling, coverage metric self-reporting and other content space implementations described herein can be performed in any suitable computing system as now described. FIG. 5 illustrates an exemplary embodiment of a system 500 in which content space logging and profiling and coverage metric self-reporting can be implemented. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 500 therefore includes general-purpose computer 501.

In exemplary embodiments, in terms of hardware architecture, as shown in FIG. 5, the computer 501 includes a processor 505, memory 510 coupled to a memory controller 515, and one or more input and/or output (I/O) devices 540, 545 (or peripherals) that are communicatively coupled via a local input/output controller 535. The input/output controller 535 can be, but is not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 505 is a hardware device for executing software, particularly that stored in memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing software instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The software in memory 510 may include one or more separate programs, each of which comprises an ordered listing of executable instructions for implementing logical functions. In the example of FIG. 5, the software in the memory 510 includes the content space logging and profiling and coverage metric self-reporting methods described herein in accordance with exemplary embodiments and a suitable operating system (OS) 511. The OS 511 essentially controls the execution of other computer programs, such the content space logging and profiling and coverage metric self-reporting systems and methods as described herein, and provides scheduling, input-output control, file and data management, memory management, and communication control and related services.

The content space logging and profiling and coverage metric self-reporting methods described herein may be in the form of a source program, executable program (object code), script, or any other entity comprising a set of instructions to be performed. When a source program, then the program needs to be translated via a compiler, assembler, interpreter, or the like, which may or may not be included within the memory 510, so as to operate properly in connection with the OS 511. Furthermore, the content space logging and profiling and coverage metric self-reporting methods can be written as an object oriented programming language, which has classes of data and methods, or a procedure programming language, which has routines, subroutines, and/or functions.

In exemplary embodiments, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In exemplary embodiments, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In exemplary embodiments, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the software in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to execute software stored within the memory 510, to communicate data to and from the memory 510, and to generally control operations of the computer 501 pursuant to the software. The content space logging and profiling and coverage metric self-reporting methods described herein and the OS 511, in whole or in part, but typically the latter, are read by the processor 505, perhaps buffered within the processor 505, and then executed.

When the systems and methods described herein are implemented in software, as is shown in FIG. 5, the methods can be stored on any computer readable medium, such as storage 520, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the content space logging and profiling and coverage metric self-reporting methods are implemented in hardware, the content space logging and profiling and coverage metric self-reporting methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include obtaining user story information in logs and error messages to be implemented by service and defect analysis, and obtaining profile information mapped to user stories for analysis and available for customer review, which can include performance, usability coverage metric and usage profile.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for generating user stories for a software product, the method comprising:
    creating, by a processor, a plurality of content space specification files that each include a plurality of requirements;
    processing, by the processor, the plurality of content space specification files to generate the user stories that are related to real time data of the software product;
    defining, by the processor, a content space for representing a portion of the software via a set of dimensions;
    mapping, by the processor, the user stories to the content space; and
    traversing, by the processor, the content space to generate the user stories, wherein the content space includes a plurality of cells, each of the plurality of cells corresponding to one of the user stories, each of the plurality of cells having multiple dimensions, each of the multiple dimensions having one or more values, the multiple dimensions including release, noun, verb, interface, and platform, wherein the verb, interface and platform dimensions are orthogonal and noun-specific; and
    embedding, by the processor, the content space with the software product,
    wherein during execution of the software product the content space is configured to store user stories include at least one of real time log data, profile statistics data, and coverage metric self-reporting data.

2. The computer-implemented method as claimed in claim 1 further comprising outputting, by the processor, the user stories.

3. The computer-implemented method as claimed in claim 1 wherein processing the plurality of content space specification files comprises identifying content space specification statements in each of the plurality of content space specification files.

4. The computer-implemented method as claimed in claim 1 wherein traversing the content space comprises:
    for each of the noun dimensions, for each of the plurality of cells:
        traversing, by the processor, other dimensions of the multiple dimensions of the cell, one value at a time, to generate the user story corresponding to the cell.

5. The computer-implemented method as claimed in claim 2 further comprising grouping, by the processor, the content space.

6. The computer-implemented method as claimed in claim 2 further comprising folding, by the processor, the content space.

7. A computer program product for generating user stories for a software product, the computer program product including a non-transitory computer readable medium storing instructions for causing a computer to implement a method, the method comprising:
    creating, a the processor, a plurality of content space specification files that each include a plurality of requirements;
    processing, by the processor, the plurality of content space specification files to generate the user stories that are related to real time data of the software product;
    defining, by the processor, a content space for representing a portion of the software via a set of dimensions;
    traversing, by the processor, the content space to generate the user stories, wherein the content space includes a plurality of cells, each of the plurality of cells corresponding to one of the user stories, each of the plurality of cells having multiple dimensions, each of the multiple dimensions having one or more values, the multiple dimensions including release, noun, verb, interface, and platform, wherein the verb, interface and platform dimensions are orthogonal and noun-specific; and
    mapping, by the processor, the user stories to the content space; and
    embedding, by the processor, the content space with the software product,
    wherein during execution of the software product the content space is configured to store user stories include at least one of real time log data, profile statistics data, and coverage metric self-reporting data.

8. The computer program product as claimed in claim 7, wherein the method further comprises outputting the user stories.

9. The computer program product as claimed in claim 7 wherein processing the plurality of content space specification files comprises identifying content space specification statements in each of the plurality of content space specification files.

10. The computer program product as claimed in claim 7 wherein traversing the content space comprises
    for each of the noun dimensions, for each of the plurality of cells:
        traversing, by the processor, other dimensions of the multiple dimensions of the cell, one value at a time, to generate the user story corresponding to the cell.

11. The computer program product as claimed in claim 8, wherein the method further comprises grouping the content space.

12. The computer program product as claimed in claim 8, wherein the method further comprises folding the content space.

* * * * *